US008952947B2

(12) United States Patent
Li et al.

(10) Patent No.: US 8,952,947 B2
(45) Date of Patent: Feb. 10, 2015

(54) DISPLAY METHOD FOR SUNLIGHT READABLE AND ELECTRONIC DEVICE USING THE SAME

(71) Applicant: HTC Corporation, Taoyuan County (TW)

(72) Inventors: Huan-Hsin Li, Taoyuan County (TW); Chih-Jen Hu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 111 days.

(21) Appl. No.: 13/707,603

(22) Filed: Dec. 7, 2012

(65) Prior Publication Data

US 2014/0160099 A1 Jun. 12, 2014

(51) Int. Cl.

| | |
|---|---|
| ***G06F 3/038*** | (2013.01) |
| ***G09G 5/00*** | (2006.01) |
| ***G09G 5/10*** | (2006.01) |
| ***G09G 3/36*** | (2006.01) |

(52) U.S. Cl.

CPC .................................... *G09G 3/36* (2013.01)
USPC ............................ 345/207; 345/206; 345/690

(58) Field of Classification Search

USPC .......................................................... 345/207
See application file for complete search history.

(56) References Cited

U.S. PATENT DOCUMENTS

| | | | | |
|---|---|---|---|---|
| 4,888,599 | A | 12/1989 | Harwood et al. | |
| 8,159,503 | B2 | 4/2012 | Park | |
| 2009/0051711 | A1* | 2/2009 | Evanicky et al. | 345/690 |
| 2011/0221720 | A1* | 9/2011 | Kuo et al. | 345/206 |
| 2012/0081279 | A1 | 4/2012 | Greenebaum et al. | |

FOREIGN PATENT DOCUMENTS

| | | |
|---|---|---|
| TW | 554625 | 9/2003 |
| TW | 200705347 | 2/2007 |
| TW | 200849197 | 12/2008 |
| TW | 201131752 | 9/2011 |
| TW | 201232504 | 8/2012 |

OTHER PUBLICATIONS

"Office Action of Taiwan Counterpart Application", issued on Oct. 16, 2014, pp. 1-18.

* cited by examiner

*Primary Examiner* — Charles V Hicks
(74) *Attorney, Agent, or Firm* — Jianq Chyun IP Office

(57) ABSTRACT

A display method for sunlight readable is provided, which is applicable to an electronic device having a display panel. The display method includes the following steps. An ambient light sensor value and image content are obtained. Next, a liquid crystal (LC) driving voltage is altered based on the ambient light sensor value and the image content, wherein the LC driving voltage is increasingly proportional to the ambient light sensor value and exceeds a normal operation driving voltage when the ambient light sensor value exceeds a high luminance value. Then, the display panel is drived under the LC driving voltage. Finally, a sunlight readable image is displayed on the display panel.

20 Claims, 9 Drawing Sheets

DISPLAY METHOD FOR SUNLIGHT READABLE AND ELECTRONIC DEVICE USING THE SAME

BACKGROUND

1. Field of the Invention

The present invention is directed to a display technique and more particularly, to a display technique for sunlight readable.

2. Description of Related Art

With the widespread popularization of liquid crystal displays (LCDs), requirements for functions of the LCDs have been gradually raised in many portable electronic products, especially in the portable electronic products, such as smart phones, personal digital assistants (PDAs), notebook computers (notebook PCs), tablet computers (tablet PCs) and so forth. These portable electronic products not only should be provided with good display effects indoors, but also should be maintained with the good display effects outdoors or in an environment with glaring light. Therefore, how to maintain the LCDs with good display effects in an environment with glaring light has become one of the most important trends in the LCD technique development.

Typically, when using a portable electronic product, the display content on the screen can not be clearly viewed once the portable electronic product is moved to a place under stronger sunlight. The main reason is that the sunlight outdoors has overly high brightness, and the sunlight directly irradiating on the screen is directly reflected by the screen surface, which results in the content displayed on the screen being unclearly visible by eyes. In one solution that is applied currently, the backlight brightness of the display is increased to generate less reflected light, such that the visibility of the display under glaring light is improved.

However, the aforementioned solution has to keep the brightness of the screen in a certain brightness level or higher to avoid the screen becoming darker relative to the glaring environment. Nevertheless, such solution is very power-consuming, and the user would experience eye irritation due to the overly bright screen. Therefore, in order to save power and enable images displayed on the portable electronic product to be clearly visible under various ambient light source conditions (including indoors and outdoors), development of a new display technique for sunlight readable is need.

SUMMARY

Accordingly, the present invention is directed to a display method for sunlight readable and an electronic device using the same, which is capable of increase glare visibility for a display under to meet a condition of saving power.

The present invention is directed to a display method for sunlight readable, which is applicable to an electronic device having a display panel. The display method includes the following steps. An ambient light sensor value and image content are obtained. Next, a liquid crystal (LC) driving voltage is altered based on the ambient light sensor value and the image content, wherein the LC driving voltage is increasingly proportional to the ambient light sensor value and exceeds a normal operation driving voltage when the ambient light sensor value exceeds a high luminance value. Then, the display panel is drived under the LC driving voltage.

The present invention is further directed to an electronic device including an optical sensor, a display panel and a central processing unit (CPU). The optical sensor is configured to sense an ambient light sensor value. The display panel includes a LC driver IC. The CPU is coupled to the optical sensor and the display panel and is configured to alter a LC driving voltage based on the ambient light sensor value and image content. When the ambient light sensor value exceeds a high luminance value, the LC driving voltage is increasingly proportional to the ambient light sensor value and exceeds a normal operation driving voltage. The LC driver IC of the display panel is configured to drive the display panel under the LC driving voltage.

The present invention is still directed to an electronic device including an optical sensor, a display panel and a CPU. The optical sensor is configured to sense an ambient light sense value. The display panel includes a LC driver IC. The CPU is coupled to the optical sensor and the display panel and is configured to receive the ambient light sensor value, image content and an indication of an evoked application to generate a LC driving voltage setting. The CPU transmits the LC driving voltage setting to the LC driver IC of the display panel, and after the LC driver IC is adjusted according to the LC driving voltage setting, the LC driver IC performs an analog image process on the image content so as to display a sunlight readable image.

To sum up, in the display method for sunlight readable and the electronic device using the same disclosed by the present invention, by increasing the maximum LC driving voltage of the display panel and adjusting the gamma curve simultaneously, the transmittance of the display is improved. Thus, the overall brightness of the screen image is enhanced. The display panel still can be normally used even under the bright sunlight to achieve the power-saving effect.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
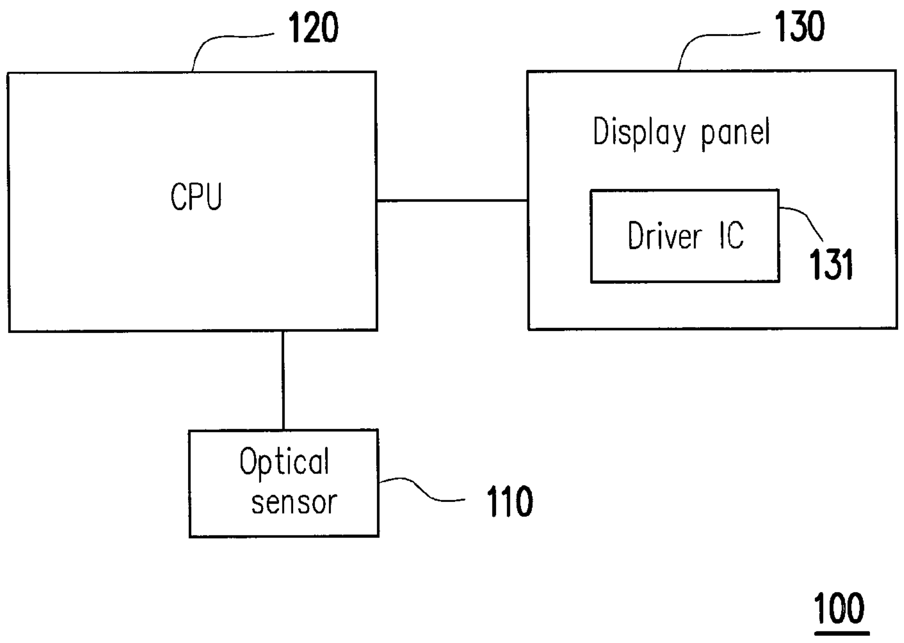
FIG. 1 is a block diagram illustrating an electronic device according to an embodiment of the present invention.

FIG. 1 is a block diagram illustrating an electronic device according to an embodiment of the present invention. Referring to FIG. 1, an electronic device 100 is an electronic device equipped with a display panel, such as a smart phone, a personal digital assistant (PDA), a tablet PC, a notebook PC, and the present invention is not limited thereto. With reference to FIG. 1, the electronic device 100 includes an optical sensor 110, a central processing unit (CPU) 120 and a display panel 130, and functions thereof are respectively described as below.

The optical sensor 110 is configured to sense ambient light sensor values of an environment where the electronic device 100 is located. The optical sensor 110 is, for example, a photo-diode, photo-transistor, a photosensitive resistor, any other element capable of generating a photo current or a detecting signal upon receiving light irradiation.

The CPU 120 is coupled to the optical sensor 110 and the display panel 130. The CPU 120 receives image content from source content and receives the ambient light sensor values from the optical sensor 110, such that the CPU 120 could alter a liquid crystal (LC) driving voltage based on the ambient light sensor value and the image content.

The display 130 is, for example, a liquid crystal display (LCD) including a driver IC 131. The driver IC 131 is capable of controlling a driving voltage applied on a liquid crystal (LC) molecule layer to change rotation angles of LC molecules by changing the driving voltage setting. Thereby, transmittance of the LCD is changed. It should be noticed that the driving voltage applied on the LCD is usually fixed in a normal operation driving voltage.

Figure 2:
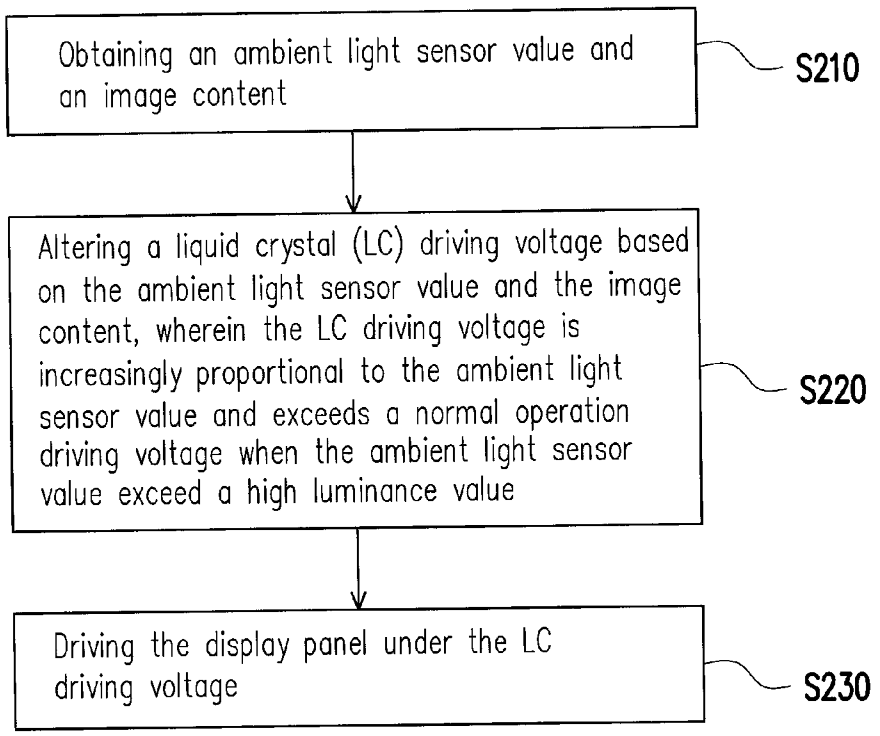
FIG. 2 is a flowchart illustrating a display method for sunlight readable according to an embodiment of the present invention.

FIG. 2 is a flowchart illustrating a display method for sunlight readable according to an embodiment of the present invention. The method of the present embodiment is applicable to the electronic device 100 depicted in FIG. 1. Hereinafter, the display method of the present invention will be described accompanying with reference to each element of the electronic device 100.

First, in step S210, an ambient light sensor value and image content are obtained in the CPU 120. Then, in step S220, a liquid crystal (LC) driving voltage is altered by the CPU 120 based on the ambient light sensor values and the image content. The LC driving voltage is increasingly proportional to the ambient light sensor value and exceeds a normal operation driving voltage when the ambient light sensor value exceeds a high luminance value. The LC driving voltage mentioned herein is referred to as the highest LC driving voltage which can be applied on the display panel 130. The LC driving voltage may be used to adjust parameter Y of the display panel 130, wherein the parameter Y in the xyY color space is defined by the Commission Internationale de l'Eclairage (CIE) and represents brightness of colors. In other words, the higher the LC driving voltage is, the higher the transmittance of the display panel is. Then, in step S230, the display panel 130 is drived under the LC driving voltage set by the CPU 120.

Figure 3A:
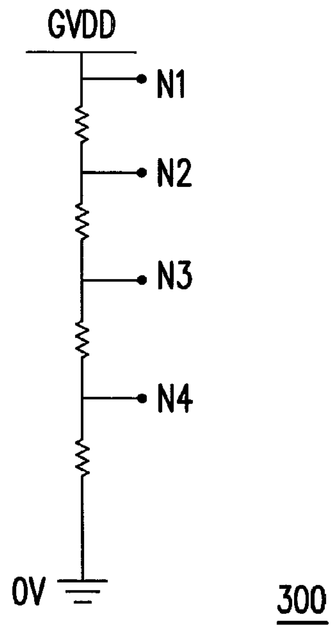
FIG. 3A is a schematic diagram showing the relationship between a liquid crystal driving voltage and a graylevel according to an embodiment of the present invention.
Figure 3B:
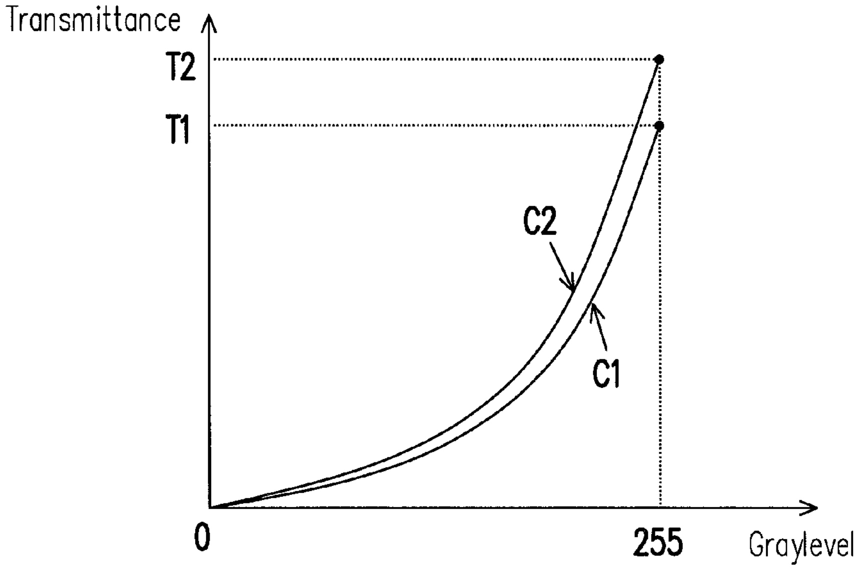
FIG. 3B is a schematic diagram showing the relationship between a graylevel and transmittance according to an embodiment of the present invention.

FIG. 3A is a schematic diagram showing the relationship between a liquid crystal (LC) driving voltage and a graylevel according to an embodiment of the present invention. FIG. 3B is a schematic diagram showing the relationship between a graylevel and transmittance according to an embodiment of the present invention. Referring to FIG. 3A, each of nodes N1~N4 in a resistor-string voltage-dividing converter 300 corresponds to different graylevel values, respectively. For example, the node N1 corresponds to a graylevel value of 255, the node N2 corresponds to a graylevel value of 200, the node N3 corresponds to a graylevel value of 100, the node N4 corresponds to a graylevel value of 50. Under a scenario where the greatest LC driving voltage GVDD is unchanged, the LC transmittance corresponding to each graylevel is a constant value, which is shown as the first curve C1 in FIG. 3B. Therein, the graylevel value of 255 has transmittance T1. However, under a scenario where the greatest LC driving voltage GVDD is increasing, the LC transmittance corresponding to each graylevel is also increasing with a increasing divided voltage of each node N1~N4, which is shown as the second curve C2 in FIG. 3B. Therein, the graylevel value of 255 has transmittance T2. The difference between the transmittance T2 and the transmittance T1 is obtained due to the increase of the greatest LC driving voltage GVDD. The enhancement of the transmittance represents the increase of the brightness of color. Therefore, the processed image of the present embodiment has better glare visibility.

Another embodiment of the present invention will be illustrated hereinafter. The labeled elements and a part of content of the preceding embodiment are followed in the present embodiment, in which the same elements are given the same or similar reference symbols, and the description regarding the same technique content is eliminated.

Figure 4:
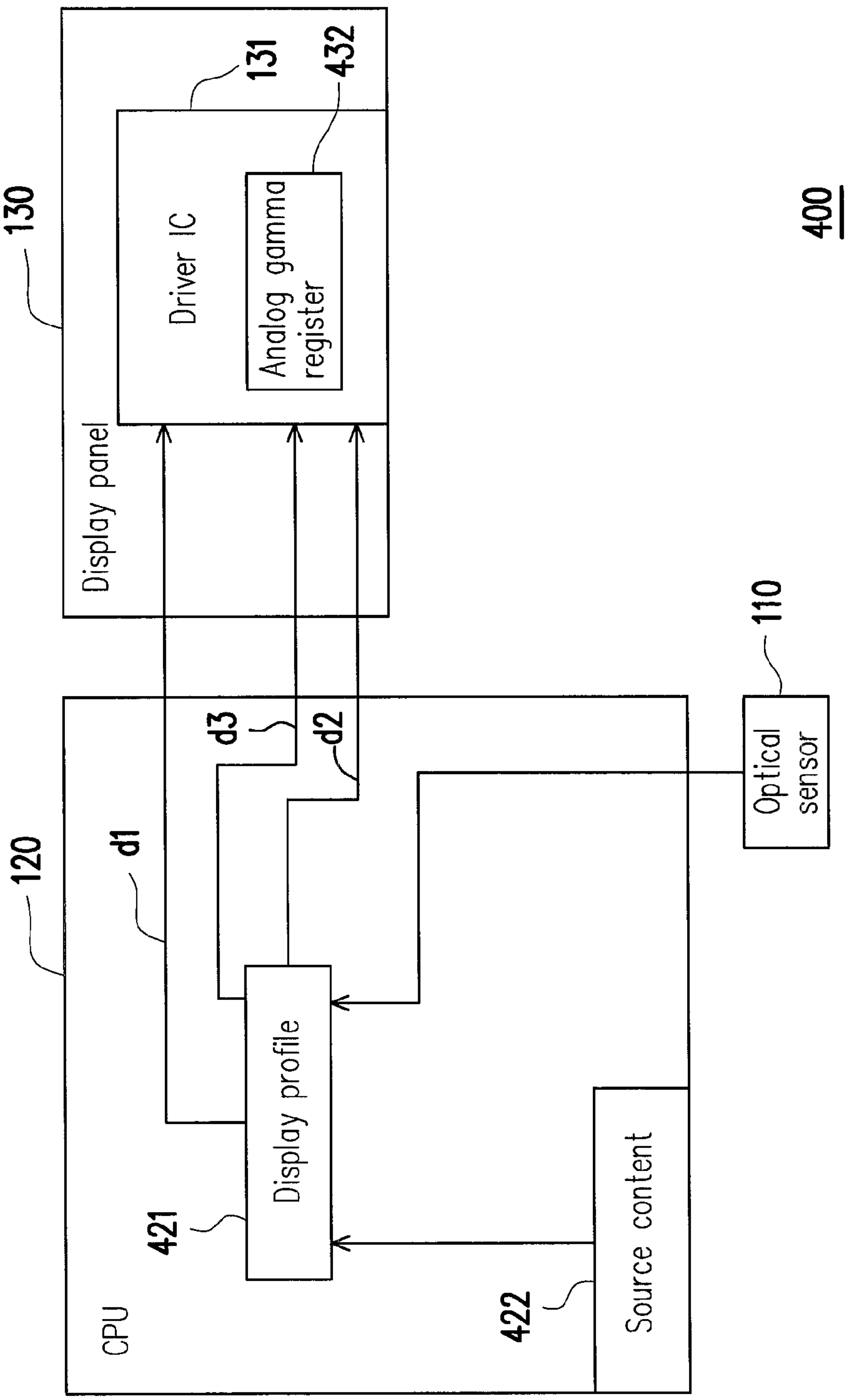
FIG. 4 is a block diagram illustrating an electronic device according to another embodiment of the present invention.

FIG. 4 is a block diagram illustrating an electronic device according to another embodiment of the present invention. Referring to FIG. 4, the electronic device 400 includes an optical sensor 110, a CPU 120 and a display panel 130. Herein, FIG. 4 is a detailed way of embodiment of the electronic device 100 in FIG. 1. Therefore, only the differences between FIG. 4 and FIG. 1 are described below.

Figure 5:
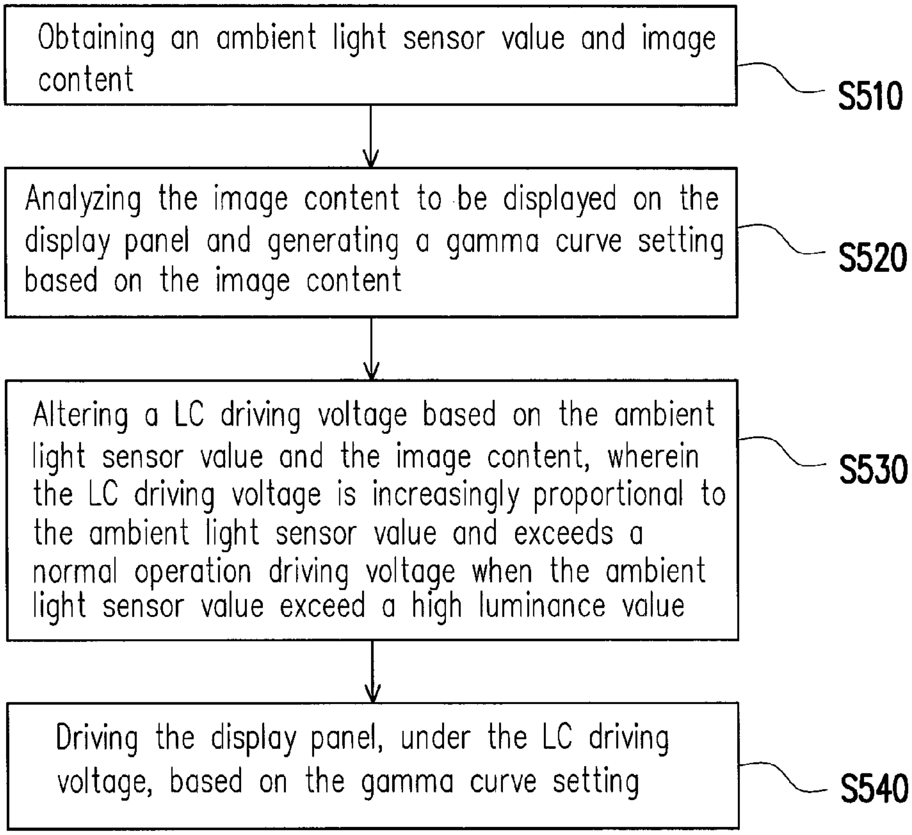
FIG. 5 is a flowchart illustrating a display method for sunlight readable according to another embodiment of the present invention.

The CPU 120 includes a display profile 421 and a source content 422. The image content is directly transmitted from the source content 422 to the display profile 421 to enable the display profile 421 to analyze detailed information of the image, such as a graylevel ratio, a contrast ratio, a portion of black point and white point, and RGB pixels. The display profile 421 is configured to analyze the image content to be displayed on the display panel 130 and generates a gamma curve setting based on the image content. The driver IC 131 of the display panel 130 of the electronic device 400 includes an analog gamma register 432. The analog gamma register 432 is configured to perform an analog image process on the image content according to the gamma curve setting, so as to display a sunlight readable image on the display panel 130. FIG. 5 is a flowchart illustrating a display method for sunlight readable according to another embodiment of the present invention. Hereinafter, the operation of the electronic device 400 will be described with reference to FIG. 4 with FIG. 5.

First, in step S510, ambient light sensor values and image content are obtained in the display profile 421 of the CPU 120. Then, in the step S520, the image content to be displayed on the display panel 130 is analyzed by the display profile 421 and a gamma curve setting is generated based on the image content.

Specifically, when the image content is determined as a dialing image, a mail image, or an image having a large portion of black point, white point, or a combination thereof, the display profile 421 generates the gamma curve setting representing a high contrast response. When the image content is determined as a picture image, a video image, an image having a large portion of color profile or a combination thereof, the display profile 421 generates the gamma curve setting representing a gamma curve with increased transmittance in middle and low graylevel range.

In step S530, the LC driving voltage is altered by the CPU 120 based on the ambient light sensor values and the image content. The LC driving voltage is increasingly proportional to the ambient light sensor value and exceeds a normal operation driving voltage when the ambient light sensor value exceeds a high luminance value.

Finally, in step S540, the display panel 130 is drived, under the LC driving voltage, based on the gamma curve setting. Specifically, image content to be displayed and the LC driving voltage setting are outputted from the display profile 421 to the driver IC 131 of the display panel 130 through a data stream d1 and a data stream d2 respectively. Besides, the gamma curve setting is transmitted from the display profile 421 to the analog gamma register 432 of the display panel 130 through a data stream d3. Here, the gamma curve setting is a digital signal which is configured to control the analog gamma register 432 in the driver IC 131. Different gamma curve setting represent different gamma curve. That is, after adjusting the LC transmittance of the display panel 130 according to the LC driving voltage and performing an analog image process on the image content, a sunlight readable image is displayed on the display panel 130.

Figure 6:
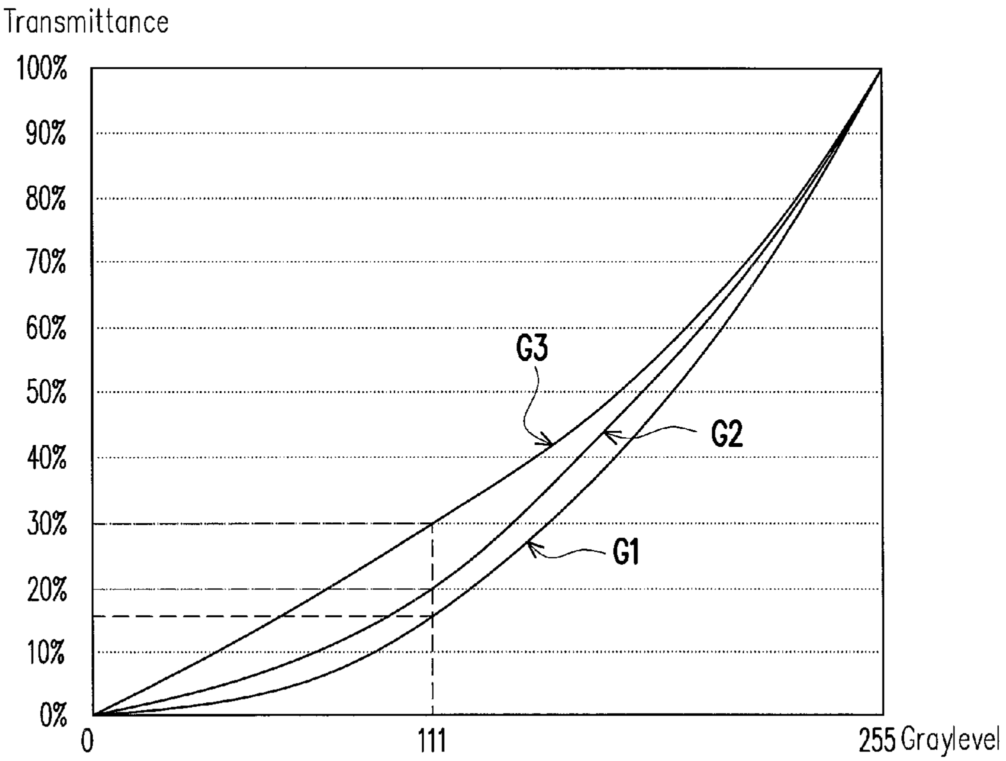
FIG. 6 is a schematic diagram illustrating a gamma curve according to another embodiment of the present invention.

FIG. 6 is a schematic diagram illustrating a gamma curve according to another embodiment of the present invention. Referring to FIG. 6, a gamma curve G1 represents a relationship between the graylevel and the transmittance for displaying the image when the gamma value is 2.2. The transmittance of the display is varied with different gamma curves. For example, when a graylevel value is 111, the transmittance of the display 130 is about 15% if a gamma curve G1 is used for correction, the transmittance of the display 130 is about 20% if a gamma curve G2 is used for correction, and the transmittance of the display 130 is increased up to about 30% if a gamma curve G3 is used for correction. It should be noticed that the gamma curves G2 and G3 with increased transmittance in middle and low graylevel range than the gamma curve G1. Therefore, the gamma curve setting of the gamma curves G2 and G3 are adapted to use by the display panel for adjusting the picture image, a video image, and an image having a large portion of color profile or a combination thereof.

Hereinafter, one more embodiment of the present invention is illustrated.

Figure 7:
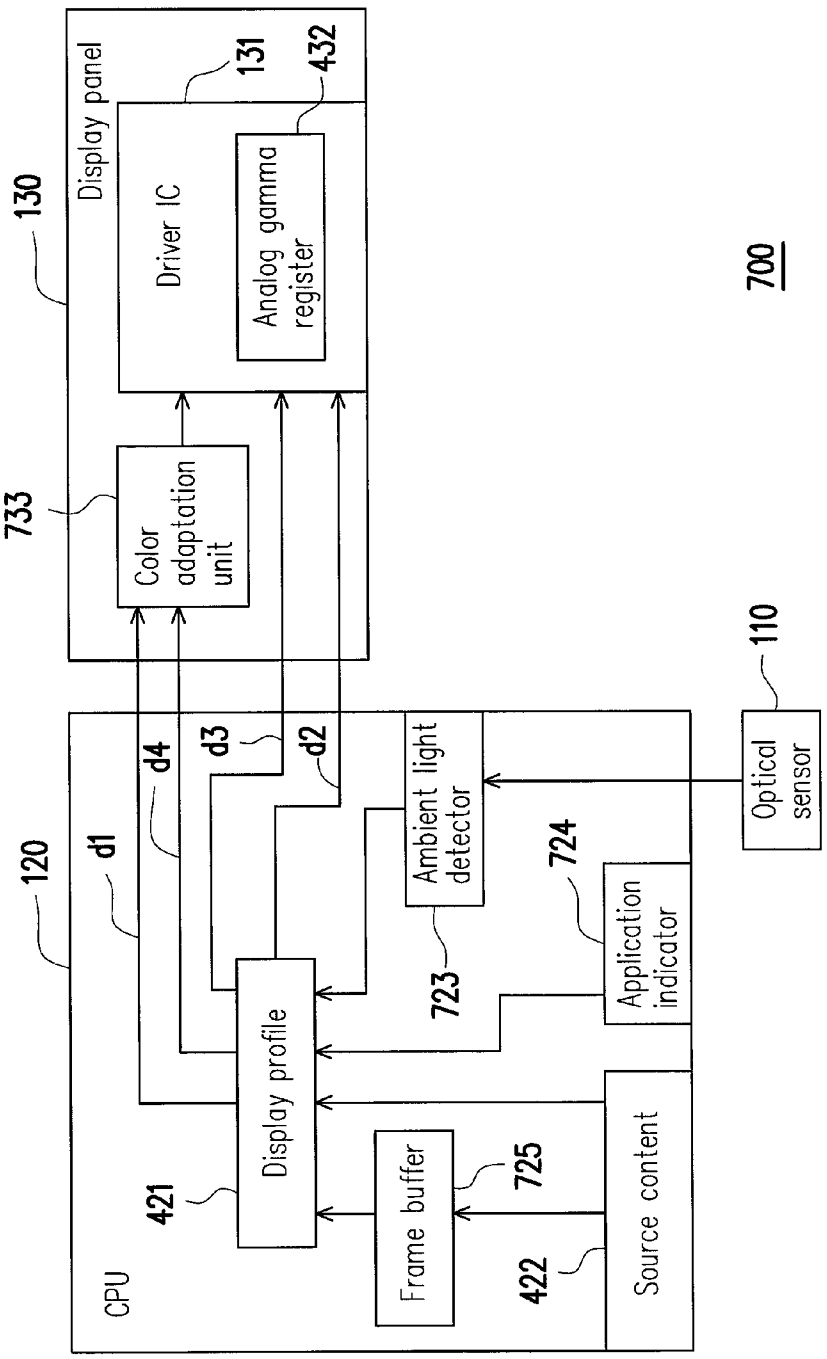
FIG. 7 is a block diagram illustrating an electronic device according to yet another embodiment of the present invention.

FIG. 7 is a block diagram illustrating an electronic device according to yet another embodiment of the present invention. FIG. 7 is a detailed way of embodiment of the electronic device 400 in FIG. 4. Therefore, only the differences between FIG. 7 and FIG. 4 are described below.

Referring to FIG. 7, the electronic device 700 includes an optical sensor 110, a CPU 120 and a display panel 130. The CPU 120 includes a display profile 421, source content 422, an ambient light detector 723, an application indicator 724 and a frame buffer 725. Besides, the display panel 130 further includes a color adaptation unit 733 which is coupled to the driver IC 131.

The ambient light detector 723 is configured to receive a signal (e.g. a voltage signal or a current signal) outputted from the optical sensor 110 so as to determine illumination intensity (unit: lux) sensed by the optical sensor 110. After the ambient light detector 723 transmits the illumination intensity of an ambient light source to the display profile 421, the display profile 421 may further perform classifying according to degrees of illumination intensity so as to generate the ambient light level information.

The application indicator 724 is coupled to the display profile 421. When an application is evoked, the application indicator 724 generates an indication of the application to the display profile 421, such that the display profile 421 analyzes the image content based on the indication of the application. The source content 124 may transmit the image content to the frame buffer 725 for temporary storage, such that the display profile 421 may read the image content as desired from the frame buffer 125 at any time.

Figure 8:
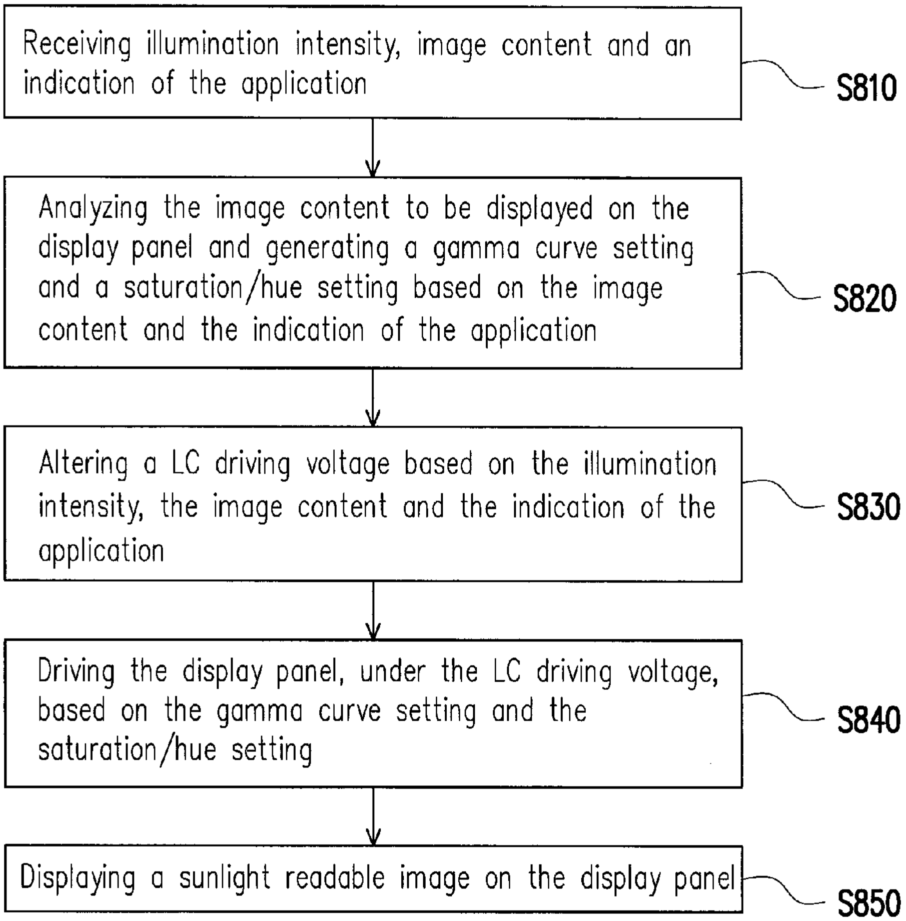
FIG. 8 is a flowchart illustrating a display method for sunlight readable according to yet another embodiment of the present invention.

FIG. 8 is a flowchart illustrating a display method for sunlight readable according to yet another embodiment of the present invention. Hereinafter, the operation of the electronic device 700 will be described with reference to FIG. 7 with FIG. 8.

First, the image content from the source content 422 and the illumination intensity from the ambient light detector 723 are received in the display profile 421 of the CPU 120, such that the ambient light level information is generated accordingly. Besides, an indication of an evoked application generated form the application indicator 724 is received (step S810).

Next, the image content to be displayed on the display panel 130 is analyzed by the display profile 421 and a gamma curve setting and a saturation/hue setting are generated based on the image content and the indication of the application. Specifically, color parameters of the image content, such as black-and-white (B & W) ratio, hue, saturation, are directly analyzed in the display profile 421, such that a saturation/hue setting is generated. In addition, the gamma curve setting is generated in the display profile 421 according to the illumination intensity and the indication of the application (step S820). And a LC driving voltage is altered based on the illumination intensity, the image content and the indication of the application (step S830).

Referring to Table 1 as below, Table 1 illustrates the relationship between the ambient light level information and the aforementioned setting.

TABLE 1

| ambient light level information | $1^{st}$ level (<8000 lux) | $2^{nd}$ level (8000~ 20000 lux) | $3^{rd}$ level (20000~ 40000 lux) | $4^{th}$ level (40000~ 60000 lux) | $5^{th}$ level (>60000 lux) |
|---|---|---|---|---|---|
| LC driving voltage setting | Original | Slightly enhance | Slightly enhance | Enhance | Enhance |
| Gamma curve setting | Original | Original | Slightly enhance | Enhance | Enhance |

Referring to Table 1, according to illumination intensity degrees, ambient light source levels may be classified into five types by the display profile 421. The adjustment on the LC driving voltage setting and the gamma curve setting are decided according to the ambient light source levels. Besides, in the portion of the gamma curve setting, the indication of the application may also be added in for further consideration. Referring to Table 2, Table 2 illustrates the relationship between the indication of the application and the aforementioned settings.

TABLE 2

| | indication of application | | | |
|---|---|---|---|---|
| | Gallery mode | Camera mode | File mode | Other mode |
| LC driving voltage setting | Enhance | Enhance | Enhance | Enhance |
| Gamma curve setting | Highly enhance the part with lower graylevel | Slightly enhance the part with lower graylevel | Unenhance the part with lower graylevel | Unenhance the part with lower graylevel |

With reference to Table 2, the indication of the application represents a type of application program that is being executed by the electronic device 700. For example, the application program that is being executed may be classified into types, such as a gallery mode, a camera mode, a file mode or any other mode. Therein, the file mode may be, for example, an application program executing a dialing program, email or e-book, where more text information is presented. Since the display panel for the application program presenting a large portion of black point, white point, or a combination thereof has to be maintained in a high contrast ratio of white on black or black on white in an image screen with, the transmittance of the part having lower graylevel is not required to be enhanced.

Back to FIG. 8, the display panel 130 is drived, under the LC driving voltage, based on the gamma curve setting and the saturation/hue setting (step S840). Specifically, the image content and the saturation/hue setting are transmitted from the display profile 421 to a color adaptation unit 733 through the data stream d1 and the data stream d4, respectively. The color adaptation unit 733 performs the color adaptation adjustment on the image content according to the saturation/hue setting so as to generate a processed image. Then the processed image is transmitted to the driver IC 131. Additionally, the LC driving voltage and the gamma setting are transmitted from the display profile 421 to the driver IC 131 through the data stream d2 and to the analog gamma register 432 through the data stream d3, respectively. The analog gamma register 432 of the driver IC 131 performs the analog image process on the processed image according to the LC driving voltage and the gamma setting. Finally, a sunlight readable image is displayed on the display panel (step S850).

Figure 9:
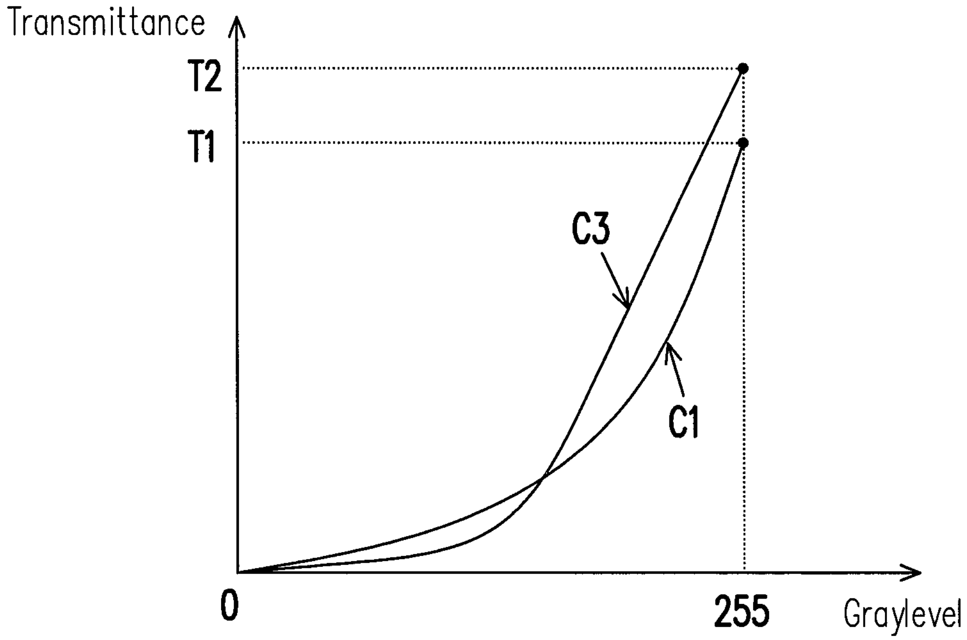
FIG. 9 is a schematic diagram showing the relationship between a graylevel and transmittance according to yet another embodiment of the present invention.

FIG. 9 is a schematic diagram showing the relationship between a graylevel and transmittance according to yet another embodiment of the present invention. Referring to FIG. 9, under a scenario where the LC driving voltage setting and the gamma settings are unchanged, the relationship between the graylevel and the transmittance of the image is shown as the first curve C1. The relationship between the adjusted LC driving voltage setting and the adjusted gamma setting according to an embodiment of the present invention is illustrated as the third curve. Therein, by increasing the greatest LC driving voltage to enhance the overall transmittance and adjusting the gamma setting for the part with lower graylevel, a gamma curve with a high contrast ratio is adopted by the display, such that the B & W contrast of the image is enhanced.

Further, it is to be mentioned that in the present embodiment, not only the transmittance of the display panel is enhanced by adjusting the LC driving voltage and the gamma curve setting, whether the ambient light source level is greater than a default brightness level is further determined by the CPU 120. If true, a brightness setting is generated and transmitted to a LED backlight module (not shown) coupled to the display panel such that backlight brightness of the display is enhanced. For example, the default brightness level is the $5^{th}$ level as shown in Table 1. When the ambient light source level is the $5^{th}$ level, the electronic device 700 may increase the LC transmittance by enhancing the greatest LC driving voltage, adjusting the gamma curve and enhancing the brightness of the backlight source when. Thereby, the electronic device 700 can still be used normally under the bright sunlight.

Based on the above, in the present invention, only when the ambient light source level is greater than the default light source level, the backlight source is increased for enhancing the brightness of the display panel. Otherwise, when the ambient light source level is not greater than the default light source level, the transmittance of the display is enhanced by increasing the LC driving voltage and adjusting the gamma curve. Accordingly, not only the power-saving effect can be achieved, but also the display can be sunlight readable under various conditions of the ambient light source.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display method for sunlight readable, applicable to an electronic device having a display panel, comprising:

obtaining an ambient light sensor value and image content;

altering a liquid crystal (LC) driving voltage based on the ambient light sensor value and the image content, wherein the LC driving voltage for a maximum graylevel value of a plurality of graylevel values corresponding to a gamma curve is increasingly proportional to the ambient light sensor value and exceeds a normal operation driving voltage when the ambient light sensor value exceed a high luminance value;

driving the display panel under the LC driving voltage.

2. The display method according to claim 1, further comprising:

analyzing the image content to be displayed on the display panel;

generating a gamma curve setting based on the image content; and driving the display panel, under the LC driving voltage, based on the gamma curve setting.

3. The display method according to claim 2, further comprising generating the gamma curve setting representing a high contrast response when the image content is determined as a dialing image, a mail image, or an image having a large portion of black point, white point, or a combination thereof.

4. The display method according to claim 2, further comprising generating the gamma curve setting representing a gamma curve with increased transmittance in middle and low graylevel range when the image content is determined as a picture image, a video image, an image having a large portion of color profile, or a combination thereof.

5. The display method according to claim 2, further comprising:

evoking an application;

obtaining an indication of the application, wherein the step of analyzing the image content is performed based on the indication of the application.

6. The display method according to claim 1, wherein the step of driving the display panel comprises:

outputting the image content and the LC driving voltage, or a combination thereof;

adjusting LC transmittance of the display panel according to the LC driving voltage; and performing an analog image process on the image content to display a sunlight readable image on the display panel.

7. An electronic device, comprising:

an optical sensor, configured to sense an ambient light sensor value;

a display panel, comprising a liquid crystal (LC) driver IC; and a central processing unit (CPU), coupled to the optical sensor and the display panel and configured to alter a LC driving voltage based on the ambient light sensor value and an image content, wherein the LC driving voltage for a maximum graylevel value of a plurality of graylevel values corresponding to a gamma curve is increasingly proportional to the ambient light sensor value and exceeds a normal operation driving voltage when the ambient light sensor value exceeds a high luminance value, wherein the LC driver IC of the display panel is configured to drive the display panel under the LC driving voltage.

8. The electronic device according to claim 7, wherein the CPU further comprises:

a display profile, for analyzing the image content to be displayed on the display panel and generating a gamma curve setting based on the image content, wherein the LC driver IC of the display panel is configured to drive the display panel, under the LC driving voltage, based on the gamma curve setting.

9. The electronic device according to claim 8, wherein the display profile is further configured to generate the gamma curve setting representing a high contrast response when the image content is determined as a dialing image, a mail image, or an image having a large portion of black point, white point, or a combination thereof.

10. The electronic device according to claim 8, wherein the display profile is further configured to generate the gamma curve setting representing a gamma curve with increased transmittance in middle and low graylevel range when the image content is determined as a picture image, a video image, an image having a large portion of color profile, or a combination thereof.

11. The electronic device according to claim 8, wherein the CPU further comprises:

an application indicator, coupled to the display profile, wherein when an application is evoked, the application indicator generates an indication of the application to the display profile, such that the display profile analyzes the image content based on the indication of the application.

12. The electronic device according to claim 8, wherein the CPU is configured to output the image content and the LC driving voltage, or a combination thereof to the LC driver IC of the display panel, and the LC driver IC is configured to adjust LC transmittance of the display panel according to the LC driving voltage.

13. The electronic device according to claim 8, wherein the LC driver IC further comprises:

an analog gamma register, receiving the gamma curve setting and performs an analog image process on the image content according to the gamma curve setting, so as to display a sunlight readable image on the display panel.

14. An electronic device, comprising:

an optical sensor, configured to sense an ambient light sensor value;

a display panel, comprising a liquid crystal (LC) driver IC; and a central processing unit (CPU), coupled to the optical sensor and the display panel and configured to receive the ambient light sensor value, an image content and an indication of an evoked application to generate a LC driving voltage setting, wherein the CPU transmits the LC driving voltage setting to the LC driver IC of the display panel to adjust a LC driving voltage for a maximum graylevel value of a plurality of graylevel values corresponding to a gamma curve, the LC driving voltage is increasingly proportional to the ambient light sensor value when the ambient light sensor value exceeds a high luminance value, and after the LC driver IC is adjusted according to the LC driving voltage setting, the LC driver IC performs an analog image process on the image content so as to display a sunlight readable image.

15. The electronic device according to claim 14, wherein a range of the LC driving voltage setting generated by the CPU falls between a first voltage value and a second voltage value to adjust brightness of color.

16. The electronic device according to claim 14, wherein the CPU further comprises:

an ambient light detector, coupled to the optical sensor and configured to receive the ambient light sensor value to determine illumination intensity of an ambient light source.

17. The electronic device according to claim 14, wherein the CPU further comprises:

a display profile, wherein the ambient light sensor value, the image content and the indication of the evoked application are received in the display profile such that the LC driving voltage setting is generated and transmitted to the LC driver IC of the display, and the LC transmittance of the display is accordingly increased.

18. The electronic device according to claim 17, wherein a saturation/hue setting is further generated in the display profile according to the ambient light sensor value, the image content and the indication of the application, and the image content and the saturation/hue setting are transmitted to the display panel.

19. The electronic device according to claim 18, wherein the display further comprises:

a color adaptation unit, coupled to the LC driver IC and configured to receive the image content and the saturation/hue setting, and generate an adjusted image by performing color adaptation adjustment on the image content according to the saturation/hue setting and transmit the adjusted image to the LC driver IC.

20. The electronic device according to claim 14, wherein the display further comprises:

a backlight module, coupled to the CPU and configured to increases backlight brightness of the display panel when the CPU determines an ambient light source level associated with the ambient light sensor value to be greater than a default brightness level so as to generate a brightness setting to the backlight module.

* * * * *